(12) United States Patent
Fu

(10) Patent No.: US 7,948,133 B2
(45) Date of Patent: May 24, 2011

(54) ROTOR AND ROTATING ELECTRIC MACHINE WITH THE ROTOR

(75) Inventor: Guowang Fu, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/521,951

(22) PCT Filed: Jan. 21, 2008

(86) PCT No.: PCT/JP2008/051143
§ 371 (c)(1),
(2), (4) Date: Jul. 1, 2009

(87) PCT Pub. No.: WO2008/093622
PCT Pub. Date: Aug. 7, 2008

(65) Prior Publication Data
US 2010/0013350 A1 Jan. 21, 2010

(30) Foreign Application Priority Data
Jan. 29, 2007 (JP) .................................. 2007-018032

(51) Int. Cl.
*H02K 21/12* (2006.01)
*H02K 1/22* (2006.01)
(52) U.S. Cl. ................................ 310/156.09; 310/261.1
(58) Field of Classification Search ........... 310/216.001, 310/261.1, 156.09
See application file for complete search history.

(56) References Cited

U.S. PATENT DOCUMENTS
4,777,397 A * 10/1988 Parshall ................... 310/156.15

FOREIGN PATENT DOCUMENTS

| | | | |
|---|---|---|---|
| GB | 2 142 120 A | 1/1985 |
| JP | 54-054205 A | 4/1979 |
| JP | 55-147933 A | 11/1980 |
| JP | 60-016145 A | 1/1985 |
| JP | 61-102140 A | 5/1986 |
| JP | 09-032813 A | 2/1997 |
| JP | 11-289729 A | 10/1999 |
| JP | 11-325147 A | 11/1999 |
| JP | 2002-174535 A | 6/2002 |
| JP | 2004-032943 A | 1/2004 |
| JP | 2005-102460 A | 4/2005 |
| JP | 2006-217770 A | 8/2006 |
| JP | 2006-316951 A | 11/2006 |
| WO | 00/16466 A1 | 3/2000 |

* cited by examiner

*Primary Examiner* — Quyen Leung
*Assistant Examiner* — Leda Pham
(74) *Attorney, Agent, or Firm* — Sughrue Mion, PLLC

(57) ABSTRACT

A motor includes: a rotating shaft having a key groove formed in the peripheral surface of the rotating shaft; a rotor core having a through hole in which the rotating shaft can be received and a key portion formed on the inner surface of the rotor core defining the through hole, the key portion being fittable in the key groove; and a stress relaxation groove formed at a position adjacent to the key portion in the inner surface of the rotor core defining the through hole, and depressed away from the peripheral surface of the rotating shaft. The inner surface of the through hole is arc-shaped. A bottom surface of the stress relaxation groove, located radially outward in the inner surface of the stress relaxation groove, includes an arc portion centered at the center defining the through hole.

4 Claims, 7 Drawing Sheets

CHANGE OF STRESS ACCORDING TO OPENING ANGLE $\theta$

US 7,948,133 B2

ROTOR AND ROTATING ELECTRIC MACHINE WITH THE ROTOR

TECHNICAL FIELD

The present invention relates to a rotor and a rotating electric machine including the rotor, and particularly to a rotor having a key member formed on a rotor core to fit in a key groove of a rotating shaft, as well as a rotating electric machine having this rotor.

BACKGROUND ART

Various methods have been proposed for fitting a rotor core and a rotating shaft with each other in a rotor of a rotating electric machine, including the one as proposed in Japanese Patent Laying-Open No. 61-102140.

A rotor for example disclosed in Japanese Patent Laying-Open No. 2004-32943 includes a key member provided on the inner wall of the rotor to extend toward the center of the rotor, and a key groove formed in the outer wall of the shaft. The key groove and the key member are formed in such a manner that circumferential rotation of one of the key groove and the key member relative to the other is allowed in the process where the key groove and key member are fitted with each other.

In this rotor, the stress generated between the rotor core and the rotating shaft while the rotor core and the rotating shaft are fitted with each other is reduced.

A rotor disclosed in Japanese Patent Laying-Open No. 2006-217770 includes a rotor core formed by stacking a plurality of thin steel sheets having respective through holes formed therein, and a shaft that is press-fit in a fit-in hole formed in the center of the rotor core. The rotor core is formed by making respective through holes in the thin steel sheets, and stacking the thin steel sheets in such a manner that smaller diameter portions and larger diameter portions of the through holes are alternately arranged in the axial direction. Further, the shaft having a roughened portion where protrusions and depressions are formed on its outer peripheral surface is press-fit in the fit-in hole of the rotor core. In this way, the rotor for a motor is structured.

The above-described conventional rotor disclosed in Japanese Patent Laying-Open No. 2004-32943, however, has a problem of iron loss due to stress concentration on the key member while the rotor core and the shaft rotate together.

Other publications, Japanese Patent Laying-Open Nos. 2006-217770 and 61-102140 do not disclose or suggest the problem of iron loss caused by stress concentration on the key member while the rotor core and the shaft are rotating together.

Here, in order to restrain stress concentration on the key member, the following method may be used. For example, in the surface of the rotor core, a groove depressed away from the surface of the rotating shaft is formed adjacent to the key member. In this way, a large stress is restrained from being generated between the key member and the key groove.

Even if such a groove is formed, however, a moment could be concentrated on a part of the inner surface of the rotor core that defines the groove, depending on the shape of the groove. Here, the problem of iron loss still arises.

DISCLOSURE OF THE INVENTION

The present invention has been made in view of the above-described problems, and an object of the invention is to provide a rotor and a rotating electric machine in which concentration of a large stress or moment on a part of the rotor core, while the rotor core and the shaft are rotating together, is restrained, thereby restraining iron loss.

A rotor according to the present invention includes a rotating shaft having a depression formed in a peripheral surface of the rotating shaft, and a rotor core having a hole where the rotating shaft can be received and having a protrusion formed on an inner surface of the rotor core defining the hole. The protrusion can be fit in the depression. The rotor also includes a stress relaxation groove formed at a position adjacent to the protrusion, in the inner surface of the rotor core defining the hole. The stress relaxation groove is depressed away from a peripheral surface of the rotating shaft. The inner surface of the rotor core defining the hole is formed in a shape of an arc. A bottom surface of the stress relaxation groove located radially outward in the rotor core, included in an inner surface of the rotor core defining the stress relaxation groove, has an arc portion centered at a center defining an inner surface of the hole.

Preferably, the stress relaxation groove includes a first inner side surface continuing from a side surface of the protrusion, and a second inner side surface opposite to the first inner side surface in the circumferential direction, the second inner side surface includes a sidewall arc portion continuing from the bottom surface, and a continuation wall continuing from the sidewall arc portion and continuing from the inner surface of the rotor core defining the hole, and the continuation wall extends in the radial direction of the rotor core.

Preferably, the stress relaxation groove is formed in the inner surface of the rotor core on either side of the protrusion.

A rotating electric machine according to the present invention has the rotor as described above.

In the rotor and the rotating electric machine of the present invention, concentration of a large stress or moment on a part of the rotor core, while the rotor core and shaft are rotating together, is restrained, so that the iron loss can be restrained.

It should be noted that two or more of those components as described above may be appropriately combined.

BEST MODES FOR CARRYING OUT THE INVENTION

Figure 1:
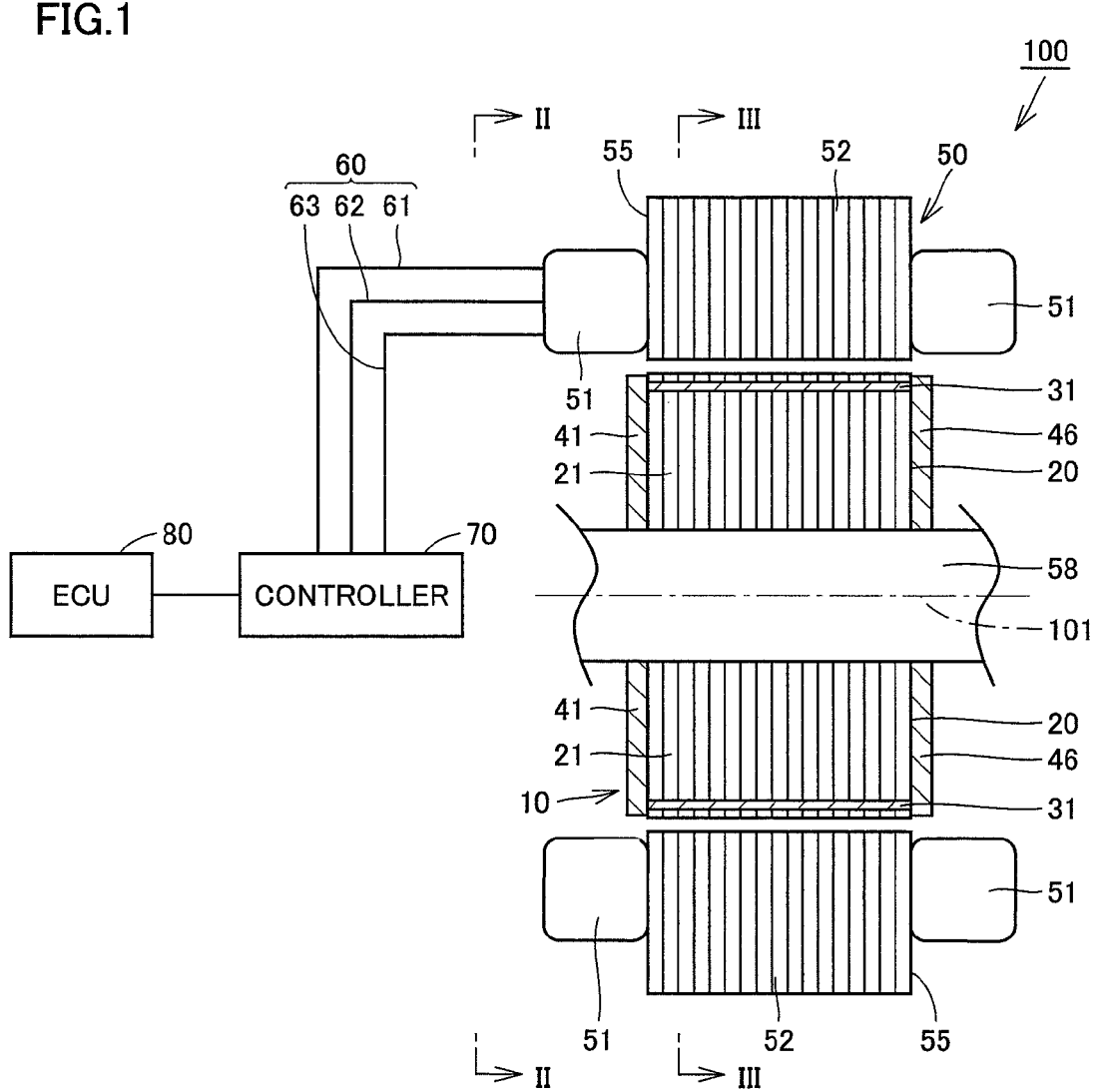
FIG. 1 is a cross-sectional view schematically illustrating a motor mounted on a hybrid vehicle.

FIGS. 1 to 9 will be used to describe a rotor and a rotating electric machine according to the present embodiment. It should be noted that like components are denoted by like reference characters, and a description thereof may not be repeated. FIG. 1 is a cross-sectional view schematically showing a motor mounted on a hybrid vehicle. The hybrid vehicle mounted with the motor as shown includes an internal combustion engine such as gasoline engine or diesel engine and a rechargeable secondary cell (battery) as drive power sources.

Referring to FIG. 1, motor (rotating electric machine) 100 includes an IPM rotor (rotor) 10, and a stator 50 disposed on the outer periphery of IPM rotor 10. IPM rotor 10 includes a rotating shaft 58 rotating about a central axis 101.

IPM rotor 10 includes a rotor core 20, a permanent magnet 31 embedded in rotor core 20, and a holding member (not shown) holding permanent magnet 31 against rotor core 20. Rotor core 20 has the shape of a cylinder extending along central axis 101. Rotor core 20 includes a plurality of electromagnetic steel sheets 21 stacked in the axial direction of central axis 101.

Stator 50 includes a stator core 55 and a coil 51 wound around stator core 55. Stator core 55 includes a plurality of electromagnetic steel sheets 52 stacked in the axial direction of central axis 101. The constituent members of rotor core 20 and stator core 55 are not limited to electromagnetic steel sheets, and rotor core 20 and stator core 55 each may be formed of a magnetic material such as powder magnetic core.

Coil 51 is electrically connected to a controller 70 by a three-phase cable 60. Three-phase cable 60 is constituted of a U-phase cable 61, a V-phase cable 62 and a W-phase cable 63. Coil 51 is constituted of a U-phase coil, a V-phase coil and a W-phase coil. To respective terminals of the three coils, U-phase cable 61, V-phase cable 62 and W-phase cable 63 are connected respectively.

To controller 70, a torque command value to be output from motor 100 is sent from an ECU (Electrical Control Unit) 80 mounted on the hybrid vehicle. Controller 70 generates a motor control current so that the torque indicated by the torque command value is output, and supplies the motor control current to coil 51 via three-phase cable 60.

Figure 2:
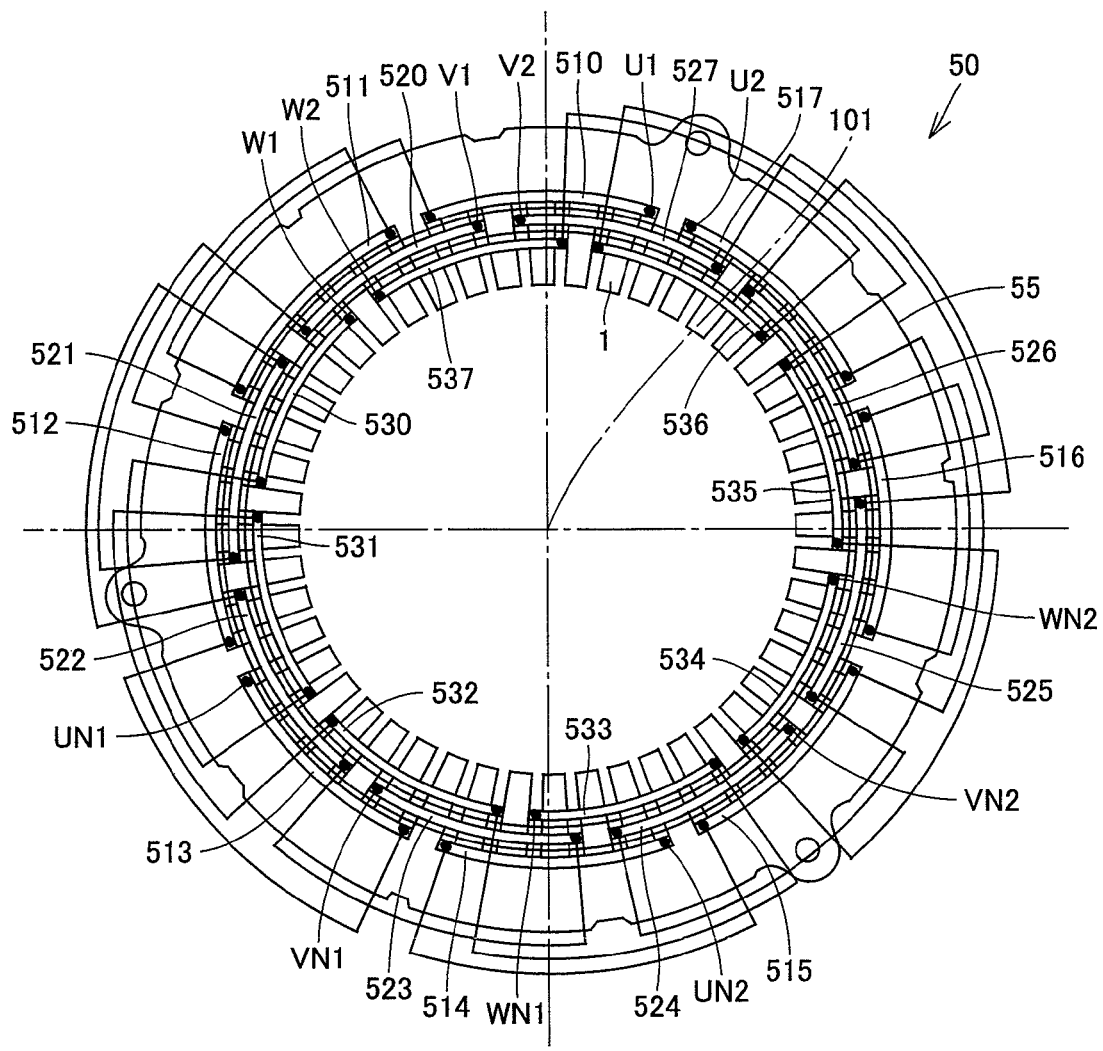
FIG. 2 is an end view of a stator along line II-II in FIG. 1.

FIG. 2 is an end view of the stator along line II-II in FIG. 1. In FIG. 2, the winding structure of the motor is schematically illustrated.

Referring to FIGS. 1 and 2, stator core 55 has the shape of a cylinder extending cylindrically along central axis 101. Stator core 55 includes, on its inner peripheral surface, a plurality of teeth 1 arranged in the direction of the circumference centered at central axis 101. In the present embodiment, stator core 55 includes 48 teeth 1.

Coil 51 is made up of coils 510 to 517 constituting the U-phase coil, coils 520 to 527 constituting the V-phase coil and coils 530 to 537 constituting the W-phase coil. Coils 510 to 517, 520 to 527 and 530 to 537 are each wound around a plurality of teeth 1 continuously arranged in the circumferential direction. Coils 510 to 517 are arranged along the outermost circumference. Coils 520 to 527 are arranged on the inner side of coils 510 to 517 in such a manner that coils 520 to 527 are displaced from coils 510 to 517 by a certain phase in the circumferential direction. Coils 530 to 537 are arranged on the inner side of coils 520 to 527 in such a manner that coils 530 to 537 are displaced from coils 520 to 527 by a certain phase in the circumferential direction.

Coils 510 to 513 are connected in series, and one end of the coils is a terminal U1 while the other end thereof is a neutral point UN1. Coils 514 to 517 are connected in series, and one end of the coils is a terminal U2 while the other end thereof is a neutral point UN2.

Coils 520 to 523 are connected in series, and one end of the coils is a terminal V1 while the other end thereof is a neutral point VN1. Coils 524 to 527 are connected in series, and one end of the coils is a terminal V2 while the other end thereof is a neutral point VN2.

Coils 530 to 533 are connected in series, and one end of the coils is a terminal W1 while the other end thereof is a neutral point WN1. Coils 534 to 537 are connected in series, and one end of the coils is a terminal W2 while the other end thereof is a neutral point WN2.

Neutral points UN1, UN2, VN1, VN2, WN1, WN2 are connected to a common point. Terminals U1, U2 are connected to U-phase cable 61 of three-phase cable 60, terminals V1, V2 are connected to V-phase cable 62 and terminals W1, W2 are connected to W-phase cable 63.

Figure 3:
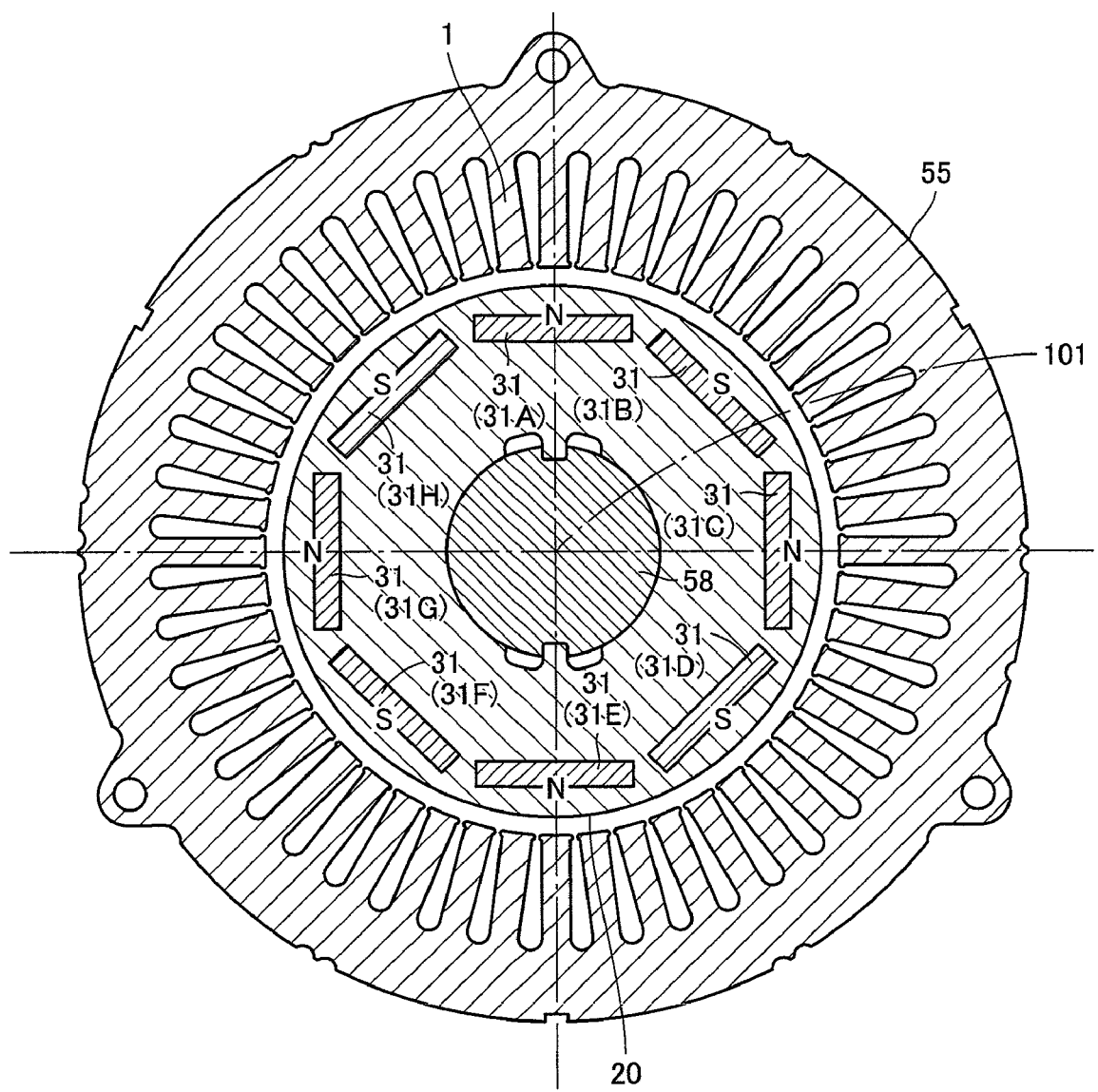
FIG. 3 is a cross-sectional view of the motor along line III-III in FIG. 1.

FIG. 3 is a cross-sectional view of the motor along line III-III in FIG. 1. Referring to FIG. 3, a plurality of permanent magnets 31 are disposed in the direction of the circumference centered at central axis 101. In the present embodiment, eight (8) permanent magnets 31 are disposed. Permanent magnet 31 is substantially in the shape of a rectangular parallelepiped. Permanent magnet 31 is substantially rectangular as seen in the axial direction of central axis 101.

Permanent magnets 31A, 31C, 31E, 31G are arranged with the N-pole located on the outer side of rotor core 20. Permanent magnets 31B, 31D, 31F, 31H are arranged with the S-pole located on the outer side of rotor core 20. Permanent magnets 31 are thus disposed in such a manner that the magnets are magnetized in the radial direction with the center at central axis 101 and respective polarities of the magnets adjacent to each other are opposite to each other. Coils 510 to 517, 520 to 527 and 530 to 537 shown in FIG. 2 are arranged opposite to these permanent magnets 31 (31A to 31H).

The number of teeth 1 is determined so that the number is an integral multiple of the number of permanent magnets 31 embedded in rotor core 20. Respective numbers of teeth 1 and permanent magnets 31 are not limited to the numbers illustrated in the present embodiment.

Figure 4:
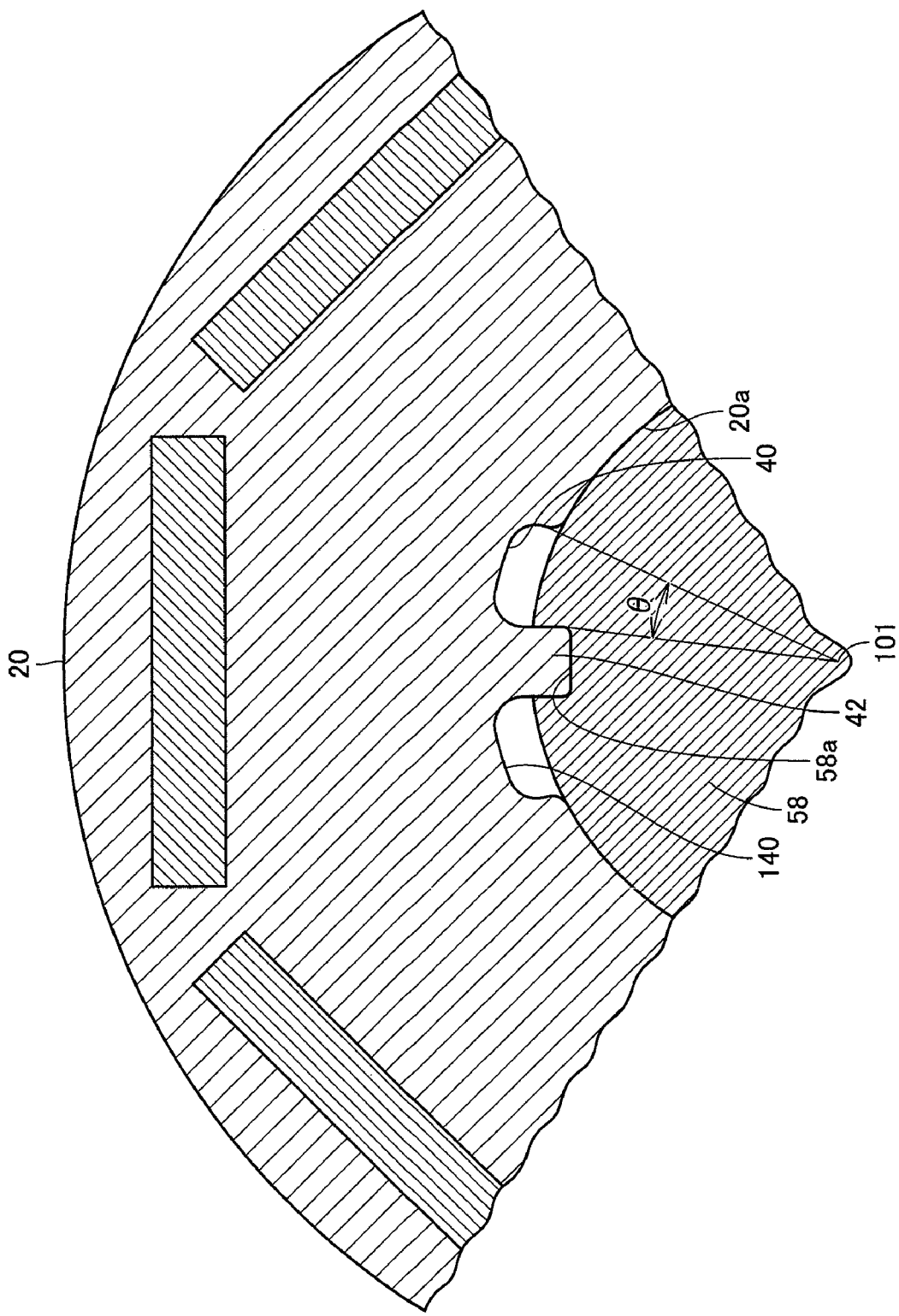
FIG. 4 is a cross-sectional view showing a portion where a rotor core and a shaft engage with each other.

FIG. 4 is a cross-sectional view showing a portion where rotor core 20 and rotating shaft 58 engage with each other. As shown in FIG. 4, rotating shaft 58 is formed in the shape of a round column, and has a key groove (depression) 58a formed in the peripheral surface of the rotating shaft to extend in the axial direction.

Rotor core 20 is formed to have an annular shape, and a through hole (hole) 20a is formed to axially extend in a central portion of rotor core 20.

On the inner peripheral surface of rotor core 20 defining through hole 20a, a key portion (protrusion) 42 extending in the axial direction is formed. Key portion 42 protrudes radially inward, and is adapted to be fittable in key groove 58a.

In the inner peripheral surface of rotor core 20 defining through hole 20a, stress relaxation grooves 40, 140 are formed adjacent to key portion 42 to depress outward in the radial direction of rotor core 20. Stress relaxation grooves 40, 140 are provided on respective opposing sides of key portion 42, and depressed away from the peripheral surface of rotating shaft 58 inserted in rotor core 20. The inner surface of rotor core 20 defining stress relaxation grooves 40, 140 is located away from the surface of rotating shaft 58, so that stress is not directly exerted from rotating shaft 58.

Figure 5:
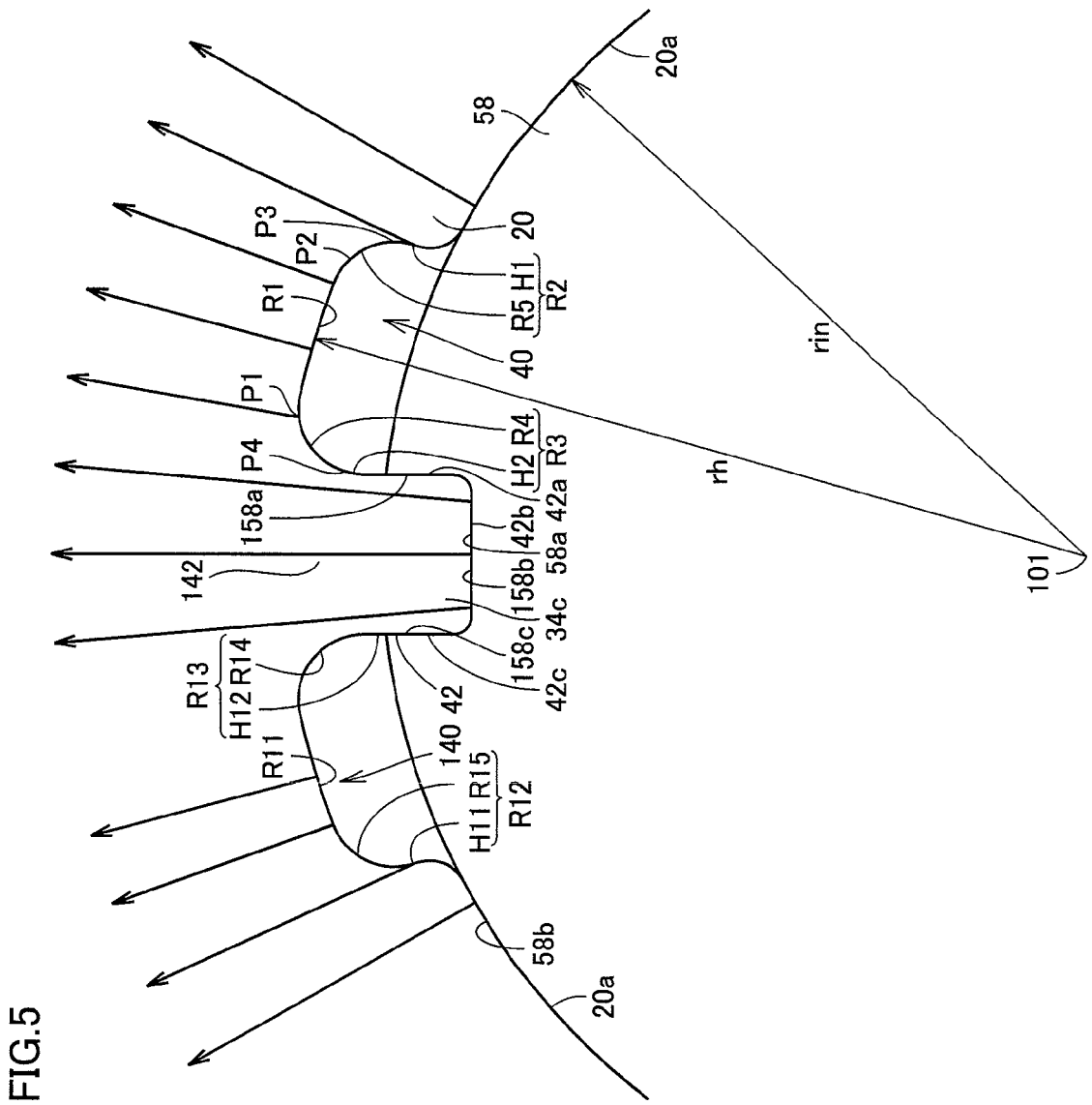
FIG. 5 is a schematic diagram showing in detail a structure of stress relaxation grooves and their surrounding portion.

FIG. 5 is a schematic diagram showing in detail the structure of stress relaxation grooves 40, 140 and their surrounding portion. As shown in FIG. 5, key groove 58a is formed in a peripheral surface 58b of rotating shaft 58.

Key groove 58a is formed to be depressed radially inward with respect to peripheral surface 58b. The inner surface of key groove 58a includes a bottom surface 158b located at the radially innermost position, and side surfaces 158a, 158c provided to continue from bottom surface 158b.

The peripheral surface of key portion 42 includes an end surface 42b located at the radially innermost position, and side surfaces 42a, 42c provided to continue from end surface 42b. In the state where key portion 42 fits in key groove 58a, side surface 42a of key portion 42 contacts side surface 158a of key groove 58a, and side surface 42c of key portion 42 contacts side surface 158c of key groove 58a.

Thus, rotating shaft 58 and rotor core 20 circumferentially engage with each other, so that a rotational force generated from rotor core 20 is transmitted to rotating shaft 58.

A portion of the inner peripheral surface of through hole 20a of rotor core 20, located opposite to bottom surface 158b with respect to stress relaxation groove 40, 140, is defined by a part of the circle centered at central axis 101 and having radius "rin."

Bottom surfaces R1, R11 that are a part of the inner peripheral surface of stress relaxation grooves 40, 140 and located at the radially outermost position, are defined by a part of the circle centered at central axis 101 and having radius "rh" (>rin).

Accordingly, the centrifugal force generated on bottom surfaces R1, R11 of stress relaxation grooves 40, 140 as rotor core 20 and rotating shaft 58 rotate in the circumferential direction, is distributed radially with respect to the center located at rotational axis 101. Here, since bottom surfaces R1, R11 are each in the form of an arc whose center is located at central axis 101 as described above, the centrifugal force acts perpendicularly to bottom surfaces R1, R11.

Thus, a bending moment or the like due to the centrifugal force can be restrained from occurring on bottom surfaces R1, R11 of stress relaxation grooves 40, 140. Specifically, on the inner surface of rotor core 20 defining bottom surfaces R1, R11 of stress relaxation grooves 40, 140, a tensile force is exerted perpendicularly to the inner surface. Here, rotor core 20 constituted of annular thin steel sheets has high stiffness against the radial tensile force as described above, and is less likely to deform.

In this way, a large moment can be restrained from occurring on at least the portion, where bottom surfaces R1, R11 of stress relaxation grooves 40, 140 are located, of the inner surface of rotor core 20 defining stress relief grooves 40. Since the moment is thus reduced, deformation or the like of the region of rotor core 20 where bottom surfaces R1, R11 are located can be restrained, so that the resistance to the centrifugal force can be improved and the iron loss can be reduced. While bottom surfaces R1, R11 are each entirely formed in the shape of an arc in the present embodiment as described above, the shape of the bottom surface is not limited to the arc, and the above-described arc portion may be a part of bottom surfaces R1, R11.

In respective regions circumferentially abutting on bottom surface R1 of stress relaxation groove 40, a sidewall (first inner surface) R3 continuing from side surface 42a of key portion 42 and a sidewall (second inner surface) R2 located circumferentially with respect to sidewall R3 are provided, respectively. In respective regions circumferentially abutting on bottom surface R11 of stress relaxation groove 140, a sidewall R13 continuing from side surface 42c of key portion 42 and a sidewall R12 located circumferentially with respect to sidewall R13 are provided as well, respectively.

Sidewall R2 includes an arc portion (sidewall arc portion) R5 continuing from an end of bottom surface R1 and a continuation wall H1 provided to continue from arc portion R5. Sidewall R12 includes an arc portion R15 continuing from an end of bottom surface R11 and a continuation wall H11 provided to continue from arc portion R15.

An end of continuation wall H1 located opposite to arc portion R5 continues from the inner peripheral surface of through hole 20a. At least a part of continuation wall H1 extends toward central axis 101 of rotor core 20 and rotating shaft 58.

Therefore, as rotating shaft 58 and rotor core 20 rotate in the circumferential direction, the vector of the centrifugal force generated on rotor core 20 and the direction in which continuation wall H1 extends coincide with each other. Accordingly, the centrifugal force generated as rotor core 20 rotates does not act orthogonally to the surface of rotor core 20 that defines continuation wall H1, but acts to radially pull the surface of rotor core 20 that defines continuation wall H1.

In this way, a bending moment caused by the centrifugal force exerted on continuation wall H1 can be restrained from occurring at a boundary position P3 between continuation wall H1 and arc portion R5. Further, since the moment occurring at boundary position P3 can be reduced, the moment occurring at a boundary position P2 between arc portion R5 and bottom surface R1 can be reduced as well.

On the inner surface of rotor core 20 where stress relaxation groove 40 is located, a large moment can be restrained from occurring at the portion where sidewall R2 is located, so that the iron loss can be reduced.

Here, arc portion R5 is curved to protrude outward in the radial direction of rotor core 20 in such a manner that arc portion R5 continues from continuation wall H1 and continues from bottom surface R1 as described above. Since bottom surface R1 and sidewall R2 continue to smoothly extending arc portion R5, stress concentration on boundary position P2 can be restrained.

Respective sidewalls R3, R13 of stress relaxation grooves 40, 140 are located on respective sides relative to a base 142 of key portion 42. The inner surface portions of rotor core 20 that define sidewalls R3, R13, respectively, are located apart from the surface of rotating shaft 58, so that stress is not directly exerted from rotating shaft 58. Thus, stress is not directly applied to base 142 from the inner surface of rotating shaft 58 that defines key groove 58a, so that base 142 and its nearby portion can be restrained from being displaced.

Here, stress relaxation groove 140 is also provided opposite to stress relaxation groove 40 with respect to key portion 42. Stress relaxation groove 140 is formed symmetrically to stress relaxation groove 40 with respect to key portion 42.

Stress relaxation groove 40 includes sidewall R3 defining one side of base 142 of key portion 42. Stress relaxation groove 140 also includes sidewall R13 defining the other side of base 142 of key portion 42.

Sidewall R3 includes a continuation wall H2 continuing from side surface 42a of key portion 42, and an arc portion R4 continuing from continuation wall H2 and continuing from bottom surface R1. Sidewall R13 also includes a continuation wall H12 continuing from side surface 42c of key portion 42, and an arc portion R14 continuing from continuation wall H12.

Arc portion R14 of sidewall R13 and arc portion R4 of sidewall R3 are curved to be farther away from each other as the distance in the direction from end surface 42b of key portion 42 toward base 142 is larger.

In other words, key portion 42 is formed in such a manner that the circumferential width of key portion 42 is larger as the distance in the direction from end surface 42b toward base 142 is larger.

Therefore, even if stress is applied from rotating shaft 58 defining key groove 58a to key portion 42 to cause a moment on base 142a, the stiffness that is enough to satisfactorily endure the moment is ensured.

Here, continuation wall H2 extends in the radial direction. Therefore, most of the centrifugal force generated on continuation wall H2 acts to radially pull continuation wall H2. Accordingly, at a boundary position P4 between continuation wall H2 and arc portion R4, a bending moment exerted due to the centrifugal force applied to continuation wall H2 can be reduced. As rotor core 20 and rotating shaft 58 rotate together, defects and displacement can be retrained from occurring in rotor core 20, and the iron loss can be reduced.

The vector of the centrifugal force generated on rotor core 20 as rotor core 20 and rotating shaft 58 rotate, forms an angle other than 90° with respect to the inner peripheral surface of arc portion R4.

Therefore, at a boundary position P1 between arc portion R4 and bottom surface R1, a bending moment is exerted due to the centrifugal force applied to arc portion R4. Further, at a boundary position P2 between arc portion R5 and bottom surface R1, a bending moment is exerted due to the centrifugal force applied to arc portion R5. Here, bottom surface R1 is located between boundary position P1 and boundary position P2, so that each moment can be restrained from concentrating on one part.

As seen from above, the sites where the bending moment is generated on stress relaxation groove 40 can be dispersed on the opposing sides of bottom surface R1. Further, since the bending moment applied to boundary position P2 is caused by the centrifugal force applied to arc portion R5, the bending moment is small. Since the bending moment applied to boundary position P4 is also caused by the centrifugal force applied to arc portion R4, the bending moment is small as well.

Since above-described stress relaxation groove 140 is structured similarly to stress relaxation groove 40, this stress relaxation groove 140 can also achieve similar functions to those of stress relaxation groove 40 as described above.

Figure 6:
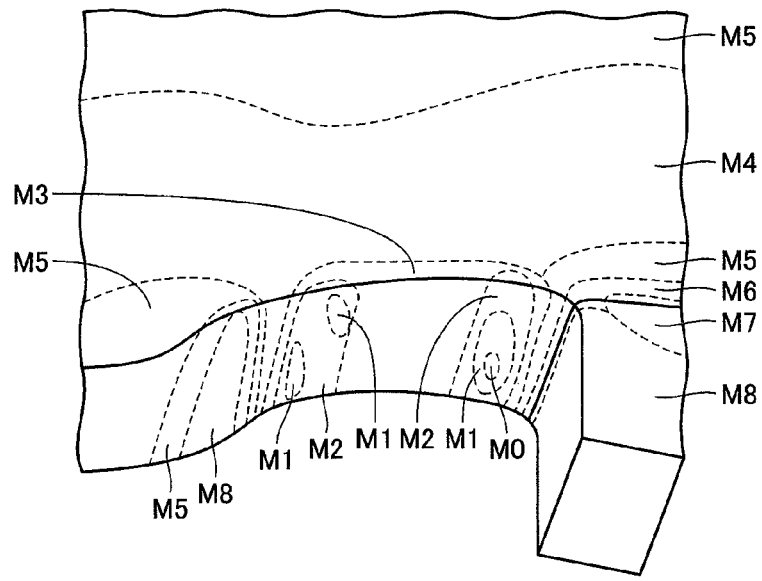
FIG. 6 illustrates a simulation result, showing a stress distribution generated on the rotor core including a stress relaxation groove shown in FIG. 5.

FIG. 6 illustrates a simulation result, showing a stress distribution generated on rotor core 20 having stress relaxation groove 40 as shown in FIG. 5. In FIG. 6, the stress decreases in the direction from a region M0 toward a region M8. The highest stress distribution is generated in region M0, while the lowest stress distribution is generated in region M8.

It is seen from FIG. 6 that the bending moment and the stress occur at a plurality of dispersed sites on the inner peripheral surface of stress relaxation groove 40. Accordingly, displacement and defect can be restrained from occurring in rotor core 20, the resistance to the centrifugal force of the core of the same material can be improved and the iron loss can be reduced. In this way, the efficiency of motor 100 shown in FIG. 1 can be enhanced.

Figure 7:
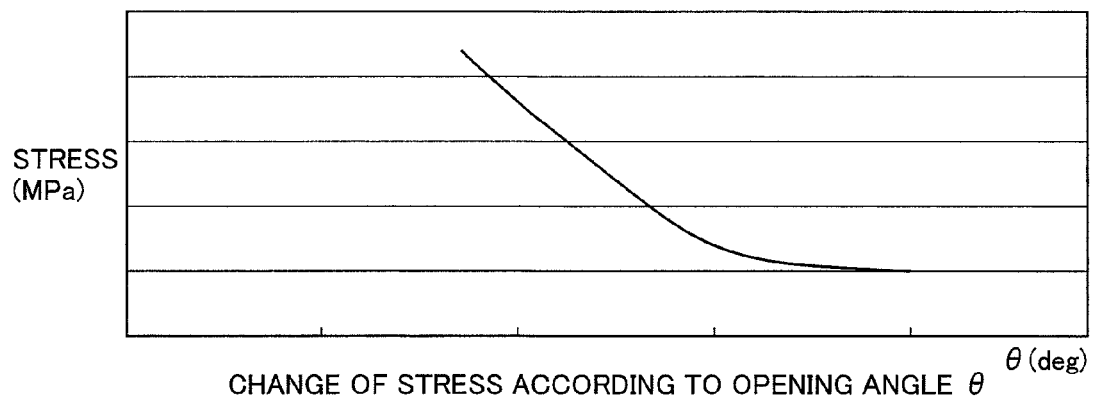
FIG. 7 is a graph having the horizontal axis representing the angle of opening of the stress relaxation groove shown in FIG. 4 and the vertical axis representing the stress occurring on the rotor core, illustrating the stress generated on the inner surface of the stress relaxation groove shown in FIG. 4 with the angle of opening varied.

FIG. 7 is a graph having the horizontal axis representing the angle of opening θ of stress relaxation groove 40 as shown in FIG. 4 and the vertical axis representing the stress generated on rotor core 20. It is seen from FIG. 7 that opening angle θ may be set for example to 10° or more to reduce the stress exerted on boundary position P1.

Figure 8:
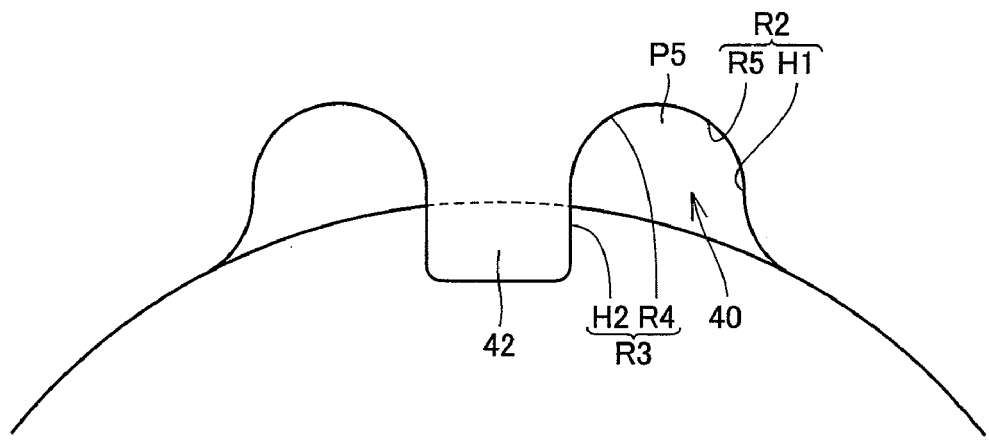
FIG. 8 is a cross-sectional view illustrating a modification concerning the shape of the stress relaxation groove.
Figure 9:
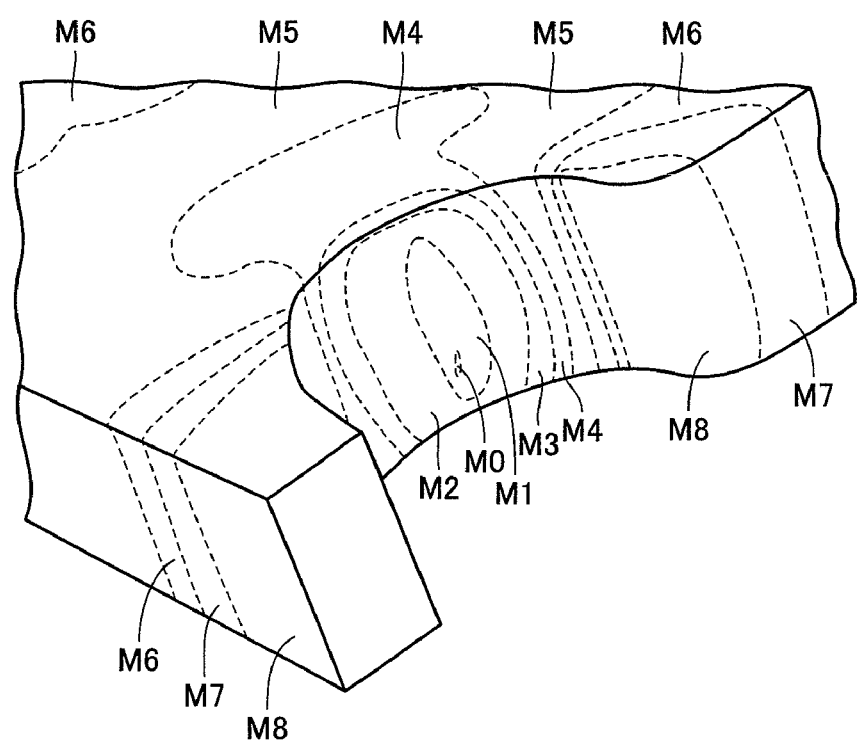
FIG. 9 illustrates a simulation result, showing a stress distribution occurring on the rotor core defining a stress relaxation groove shown in FIG. 8.

FIG. 8 is a cross-sectional view showing a modification concerning the shape of stress relaxation groove 40. FIG. 9 illustrates a simulation result, showing a stress distribution occurring on rotor core 20 defining stress relaxation groove 40 as shown in FIG. 8.

Stress relaxation groove 40 shown in FIG. 8 is formed such that a sidewall R2 and a sidewall R3 directly continue from each other, and the tangent to the inner surface at boundary position P5 and the line segment passing boundary position P5 and central axis 100 orthogonally cross each other. It is seen from FIG. 9 that the stress is distributed over a wide area centered at boundary position P5 between sidewall R2 and sidewall R3.

Here, in stress relaxation groove 40 shown in FIG. 8 as well, the bending moment applied to boundary position P5 is caused by the centrifugal force applied to arc portions R4, R5. Thus, the centrifugal force applied to continuation walls H1, H2 does not contribute to the bending moment.

In this way, the bending moment exerted on boundary position P5 can also be made small, defect and displacement can be restrained from occurring in rotor core 20, and the iron loss can be reduced.

While embodiments of the present invention have been described above, it should be construed that embodiments disclosed herein are by way of illustration in all respects, not by way of limitation. It is intended that the scope of the present invention is defined by claims, and includes all modifications and variations equivalent in meaning and scope to the claims. Further, the numerical values or the like described above are presented by way of illustration, and the present invention is not limited to the above-described numerical values and ranges.

INDUSTRIAL APPLICABILITY

The present invention is applicable to a rotor and a rotating electric machine including the rotor, and particularly suitably applied to a rotor and a rotating electric machine with a rotating shaft inserted in a rotor core.

The invention claimed is:

1. A rotor comprising:
a rotating shaft having a depression formed in a peripheral surface of said rotating shaft and provided rotatably about a rotational axis line;
a rotor core having a hole where said rotating shaft can be received, and a protrusion formed on an inner surface of said rotor core defining said hole, said protrusion being fittable in said depression; and
a stress relaxation groove formed at a position adjacent to said protrusion, in the inner surface of said rotor core defining said hole, said stress relaxation groove being depressed away from a peripheral surface of said rotating shaft,
the inner surface of said rotor core defining said hole being formed in a shape of an arc centered at said rotational axis line,
a bottom surface of said stress relaxation groove located radially outward in said rotor core, included in an inner surface of said rotor core defining said stress relaxation groove, having an arc portion centered at said rotational axis line defining an inner surface of said hole, and
said stress relaxation groove including a first inner side surface continuing from one end of said bottom surface such that said first inner side surface continues from said bottom surface and continues from a side surface of said protrusion, and a second inner side surface continuing from the other end of said bottom surface such that said second inner side surface continues from said bottom surface and continues from the inner surface of said hole.

2. The rotor according to claim 1, wherein
said first inner side surface and said second inner side surface are opposite to each other in the circumferential direction, said second inner side surface includes a sidewall arc portion continuing from said bottom surface, and a continuation wall continuing from said sidewall arc portion and continuing from the inner surface of said rotor core defining said hole, and said continuation wall extends in the radial direction of said rotor core.

3. The rotor according to claim 1, wherein
said stress relaxation groove is formed in the inner surface of said rotor core on either side of said protrusion.

4. A rotating electric machine having the rotor as recited in claim 1.

* * * * *